United States Patent
Seo et al.

(10) Patent No.: US 12,494,061 B2
(45) Date of Patent: Dec. 9, 2025

(54) INSERTION AUTOMATION METHOD AND SYSTEM BASED ON DEEP LEARNING PARCEL RECOGNITION

(71) Applicant: ELECTRONICS AND TELECOMMUNICATIONS RESEARCH INSTITUTE, Daejeon (KR)

(72) Inventors: Seonghun Seo, Daejeon (KR); Dae Hee Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 344 days.

(21) Appl. No.: 18/215,925

(22) Filed: Jun. 29, 2023

(65) Prior Publication Data

US 2024/0013539 A1     Jan. 11, 2024

(30) Foreign Application Priority Data

Jul. 7, 2022    (KR) ................. 10-2022-0083850
Apr. 10, 2023    (KR) ................. 10-2023-0046934

(51) Int. Cl.
     *G06V 20/50*         (2022.01)
     *B65G 43/00*         (2006.01)
     (Continued)

(52) U.S. Cl.
CPC .............. *G06V 20/50* (2022.01); *B65G 43/00* (2013.01); *G06T 7/60* (2013.01); *G06V 10/774* (2022.01);
(Continued)

(58) Field of Classification Search
None
See application file for complete search history.

(56) References Cited

U.S. PATENT DOCUMENTS

| 11,267,662 B2 | 3/2022 | Geyer et al. |
| 2018/0022558 A1 | 1/2018 | Kim et al. |
| 2018/0144429 A1 | 5/2018 | Kim et al. |

FOREIGN PATENT DOCUMENTS

| JP | 2007-297873 A | 11/2007 |
| JP | 2020-179355 A | 11/2020 |

(Continued)

OTHER PUBLICATIONS

Kang, JeonMin, et al. "A Study on Automated Tilt Control for a Tipper System Using RGB-D Camera-Based Cargo Detection." 2025 International Conference on Electronics, Information, and Communication (ICEIC). IEEE, 2025. (Year: 2025).*

(Continued)

*Primary Examiner* — Michelle M Entezari Hausmann
(74) *Attorney, Agent, or Firm* — LRK PATENT LAW FIRM

(57) ABSTRACT

Disclosed are an insertion automation method and system based on deep-learning parcel recognition. The insertion automation method includes determining an initial gradient change angular velocity of a tipper based on a total weight of parcels in the tipper, recognizing a loading state of the parcels in the tipper by inputting images of the parcels in the tipper to an object recognition model, and redetermining a gradient change angular velocity and gradient angle of the tipper based on the recognized loading state, in which the loading state of the parcels in the tipper includes at least one of a position, size, and packing material of the parcels in the tipper.

14 Claims, 8 Drawing Sheets

(51) Int. Cl.
*G06T 7/60* (2017.01)
*G06V 10/774* (2022.01)
*G06V 10/82* (2022.01)

(52) U.S. Cl.
CPC ........ G06V 10/82 (2022.01); *B65G 2203/041* (2013.01)

(56) References Cited

FOREIGN PATENT DOCUMENTS

| KR | 20-0191379 Y1 | 8/2000 |
| KR | 10-2001-0089533 A | 10/2001 |
| KR | 20-0405009 U | 1/2006 |
| KR | 10-2015-0142923 A | 12/2015 |
| KR | 10-1708857 B1 | 2/2017 |
| KR | 10-2018-0010683 A | 1/2018 |
| KR | 10-1959997 B1 | 3/2019 |

OTHER PUBLICATIONS

Kim, Woojin, Ki Hak Kim, and Daesub Yoon. "Learning control policy for parcel singulation." 2016 International Conference on Information and Communication Technology Convergence (ICTC). IEEE, 2016. (Year: 2016).*

* cited by examiner

INSERTION AUTOMATION METHOD AND SYSTEM BASED ON DEEP LEARNING PARCEL RECOGNITION

CROSS-REFERENCE TO RELATED APPLICATION(S)

This application claims the priority benefit of Korean Patent Application No. 10-2022-0083850 filed on Jul. 7, 2022, and Korean Patent Application No. 10-2023-0046934 filed on Apr. 10, 2023, in the Korean Intellectual Property Office, the disclosures of which are incorporated herein by reference for all purposes.

BACKGROUND

1. Field of the Invention

One or more embodiments relate to a method and device for improving the insertion efficiency of a parcel sorter by using a deep learning-based parcel recognition algorithm.

2. Description of Related Art

The development of untact services leads to the rapid growth of the parcel delivery industry and a surge in the volume of parcels. Postal centers or distribution centers that need to process a large volume of parcels use a parcel sorting system to sort the parcels rapidly and efficiently.

A processing quantity of the parcel sorting system may vary depending on the type of parcel sorter, the number of inductions, a parcel insertion method, the number of workers, and the like. The parcel sorting system may generally move parcels at about 2.5 meter per second (m/s). Based on the movement, an inserter of the parcel sorting system may need to insert parcels such that the parcel sorter, while being as full as possible, may perform a sorting operation. In this case, two, three, or more people may need to take care of the inserter that is connected to an induction and may need to manually insert parcels into a pallet, and thus, the efficiency may be low.

SUMMARY

An aspect provides a method and device for improving the insertion efficiency of parcels that are inserted into a parcel sorter by using a tipper for automatically inserting the parcels into an inserter of a parcel sorting system.

Another aspect also provides a method and device for decreasing the damage risk of parcels that are inserted into a parcel sorter by controlling the gradient of an insertion line belt that is adjacent to a tipper and the tipper that is at an inserter of a parcel sorting system.

However, technical aspects are not limited to the foregoing aspects, and there may be other technical aspects.

According to an aspect, a parcel recognition method includes obtaining images of parcels in a tipper through a plurality of camera sensors and training an object recognition model to infer a packing material of each of the parcels in response to the images input to the object recognition model that is based on deep learning through training data including the packing material labeled for each of the parcels included in the images.

The method may further include training the object recognition model to infer the size of the parcels through coordinate information of the parcels included in the images in response to the images being input.

The training the object recognition model to infer the size of the parcels may include bounding an individual recognition area of each of the parcels based on the coordinate information of the parcels included in the images and estimating the size of a parcel corresponding to the individual recognition area based on the number of pixels related to the individual recognition area that is bound.

The obtaining may include obtaining an image of the parcels in the tipper at each preset interval of a gradient change of the tipper through the plurality of camera sensors.

According to another aspect, an insertion automation method includes determining an initial gradient change angular velocity of a tipper based on the total weight of parcels in the tipper; recognizing a loading state of the parcels in the tipper by inputting images of the parcels in the tipper to an object recognition model; and redetermining a gradient change angular velocity of the tipper based on the recognized loading state, in which the loading state of the parcels in the tipper includes at least one of the position, size, and packing material of the parcels in the tipper.

The object recognition model may include a neural network trained to infer a packing material of each of parcels included in a training image in response to the training image that is predetermined being input.

The object recognition model may include a neural network trained to infer a size of parcels based on coordinate information of the parcels included in a training image in response to the training image that is predetermined being input.

The method may further include extracting a relative distance of the parcels in the tipper through heterogeneous sensors.

The recognizing may include updating the loading state of the parcels in the tipper by combining the extracted relative distance of the parcels in the tipper with a recognition result of the object recognition model.

The method may further include adjusting a gradient angle of an insertion line belt that is adjacent to the tipper based on the recognized loading state of the parcels in the tipper.

A damping system may be applied to a lower part of the insertion line belt in which the gradient angle is adjusted.

According to another aspect, an insertion automation device includes one or more processors and a memory configured to load or store a program executed by the one or more processors, in which the program includes instructions configured to determine an initial gradient change angular velocity of a tipper based on the total weight of parcels in the tipper, recognize a loading state of the parcels in the tipper by inputting images of the parcels in the tipper to an object recognition model, and redetermine a gradient change angular velocity of the tipper based on the recognized loading state, in which the loading state of the parcels in the tipper includes at least one of the position, size, and packing material of the parcels in the tipper.

The object recognition model may include a neural network trained to infer a packing material of each of parcels included in a training image in response to the training image that is predetermined being input.

The object recognition model may include a neural network trained to infer a size of parcels based on coordinate information of the parcels included in a training image in response to the training image that is predetermined being input.

The one or more processors may extract a relative distance of the parcels in the tipper through heterogeneous sensors.

The one or more processors may update and recognize the loading state of the parcels in the tipper by combining the extracted relative distance of the parcels in the tipper with a recognition result of the object recognition model.

The one or more processors may adjust a gradient angle of an insertion line belt that is adjacent to the tipper based on the recognized loading state of the parcels in the tipper.

A damping system may be applied to a lower part of the insertion line belt in which the gradient angle is adjusted.

According to an aspect, the insertion efficiency of parcels that are inserted into a parcel sorter may be improved by using a tipper for automatically inserting the parcels into an inserter of a parcel sorting system.

According to another aspect, a damage risk of parcels that are inserted into a parcel sorter may decrease by controlling the gradient of an insertion line belt that is adjacent to a tipper and the tipper that is at an inserter of a parcel sorting system.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
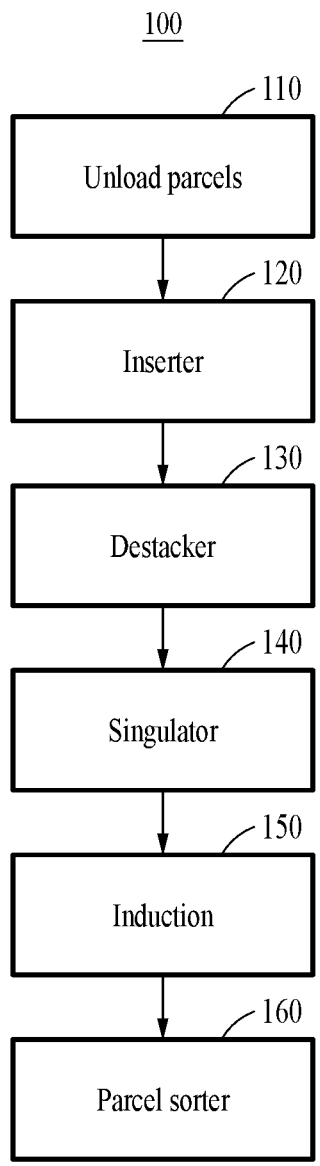
FIG. 1 is a diagram illustrating a parcel sorting system according to an embodiment.

The following detailed structural or functional description is provided as an example only and various alterations and modifications may be made to embodiments. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a," "an," and "the" are intended to include the plural forms as well, unless the context clearly indicates otherwise. As used herein, "A or B", "at least one of A and B", "at least one of A or B", "A, B or C", "at least one of A, B and C", and "at least one of A, B, or C," each of which may include any one of the items listed together in the corresponding one of the phrases, or all possible combinations thereof. It will be further understood that the terms "comprises/including" and/or "includes/including" when used herein, specify the presence of stated features, integers, operations, operations, elements, and/or components, but do not preclude the presence or addition of one or more other features, integers, operations, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating a parcel sorting system according to an embodiment.

Referring to FIG. 1, a parcel sorting system 100 may perform a parcel sorting process from an operation 110 of unloading parcels to an operation of a parcel sorter 160 to sort the parcels transported from another region by delivery destinations. First, the parcels may be inserted into an inserter of the parcel sorting system 100 by being loaded on a rolltainer or a flat pallet. The parcel sorting system 100 may improve the insertion efficiency of the parcels loaded on the rolltainer or the flat pallet by using a tipper at the inserter 120.

However, the use of a tipper may be limited according to the weight or damage risk of the parcels because the tipper tilts and exports the parcels loaded on the rolltainer or the flat pallet.

The parcel sorting system 100 may control the gradient angle of the tipper included in the inserter 120 and the gradient angle of an insertion line belt adjacent to the tipper by combining a deep learning-based parcel recognition algorithm with parcel recognition information obtained through various types of additional sensors. Accordingly, the parcel sorting system 100 may efficiently insert the parcels loaded on the rolltainer or the flat pallet into the inserter 120 regardless of the weight or damage risk of the parcels.

The parcels inserted into the inserter 120 may be supplied to a destacker 130 of the parcel sorting system 100. When a large number of parcels are inserted in multiple layers, the destacker 130 may integrate the layers into one layer and send the parcels to a singulator 140 of the parcel sorting system 100.

When a plurality of parcels is simultaneously sent from the destacker 130, the singulator 140 may arrange the parcels in a line to insert the parcels in a single parcel unit into an induction 150 at a rear edge of the singulator 140.

The induction 150 may perform a function of adjusting an insertion speed of the parcels that are inserted into the parcel sorter 160. Lastly, the parcels in which the insertion speed is adjusted by the induction 150 may be sorted according to destination information through the parcel sorter 160.

Figure 2:
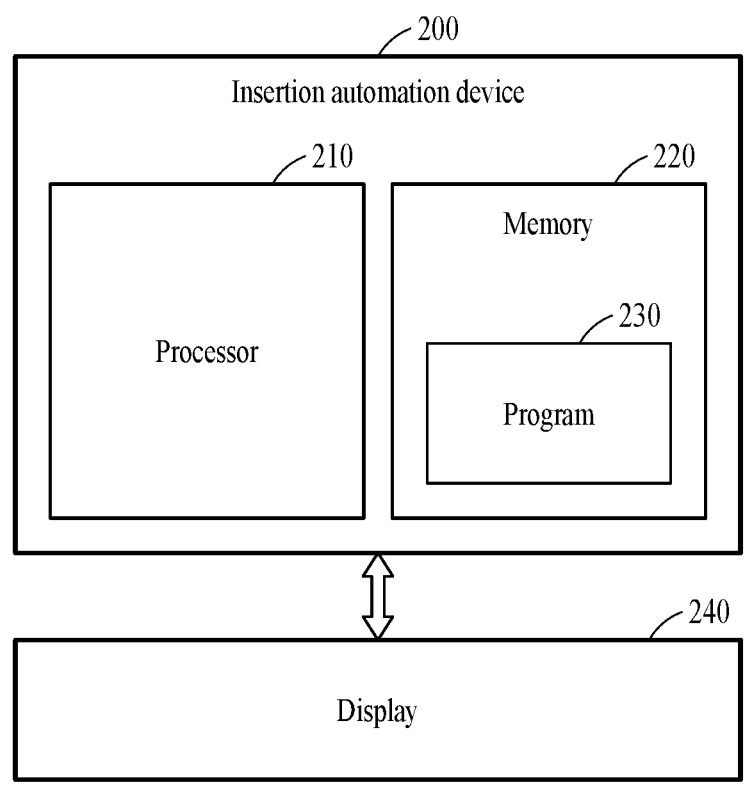
FIG. 2 is a diagram illustrating a configuration of an insertion automation device according to an embodiment.

FIG. 2 is a diagram illustrating a configuration of an insertion automation device according to an embodiment.

Referring to FIG. 2, as illustrated in FIG. 2, an insertion automation device 200 may include one or more processors 210 and a memory 220 for loading or storing a program 230 performed by the one or more processors 210. The components included in the insertion automation device 200 of FIG. 2 are just an example, and one of ordinary skill in the art may understand that other generally used components may be further included, besides the components illustrated in FIG. 2.

The one or more processors 210 may control an overall operation of each component of the insertion automation device 200. The one or more processors 210 may include at least one of a central processing unit (CPU), a microprocessor unit (MPU), a microcontroller unit (MCU), a graphics processing unit (GPU), a neural processing unit (NPU), a digital signal processor (DSP), and other well-known types of processors in a relevant field of technology. In addition, the one or more processors 210 may perform an operation of at least one application or program to perform the methods/operations described herein according to embodiments. The insertion automation device 200 may include one or more processors.

The memory 220 may store one of or two or more combinations of various pieces of data, commands, and pieces of information that are used by the components (e.g., the one or more processors 210) included in the insertion automation device 200. The memory 220 may include a volatile memory or a non-volatile memory.

The program 230 may include one or more actions through which the methods/operations described herein according to embodiments are implemented and may be stored in the memory 220 as software. In this case, an operation may correspond to a command that is implemented in the program 230. For example, the program 230 may include instructions to perform an operation of obtaining images of parcels in a tipper through a plurality of camera sensors and an operation of training an object recognition model to infer a packing material of each of the parcels in response to the images being input to the object recognition model that is based on deep learning through training data including the packing material labeled for each of the parcels included in the images.

When the program 230 is loaded in the memory 220, the one or more processors 210 may execute a plurality of operations to implement the program 230 and perform the methods/operations described herein according to embodiments.

An execution screen of the program 230 may be displayed through a display 240. Although the display 240 is illustrated as being a separate device connected to the insertion automation device 200 in FIG. 2, the display 240 may be included in the components of the insertion automation device 200 when the insertion automation device 200 is a smartphone, a tablet, or other terminals that are portable by a user. The screen displayed on the display 240 may be a state before the information is input to the program 230 or may be an execution result of the program 230.

Figure 3:
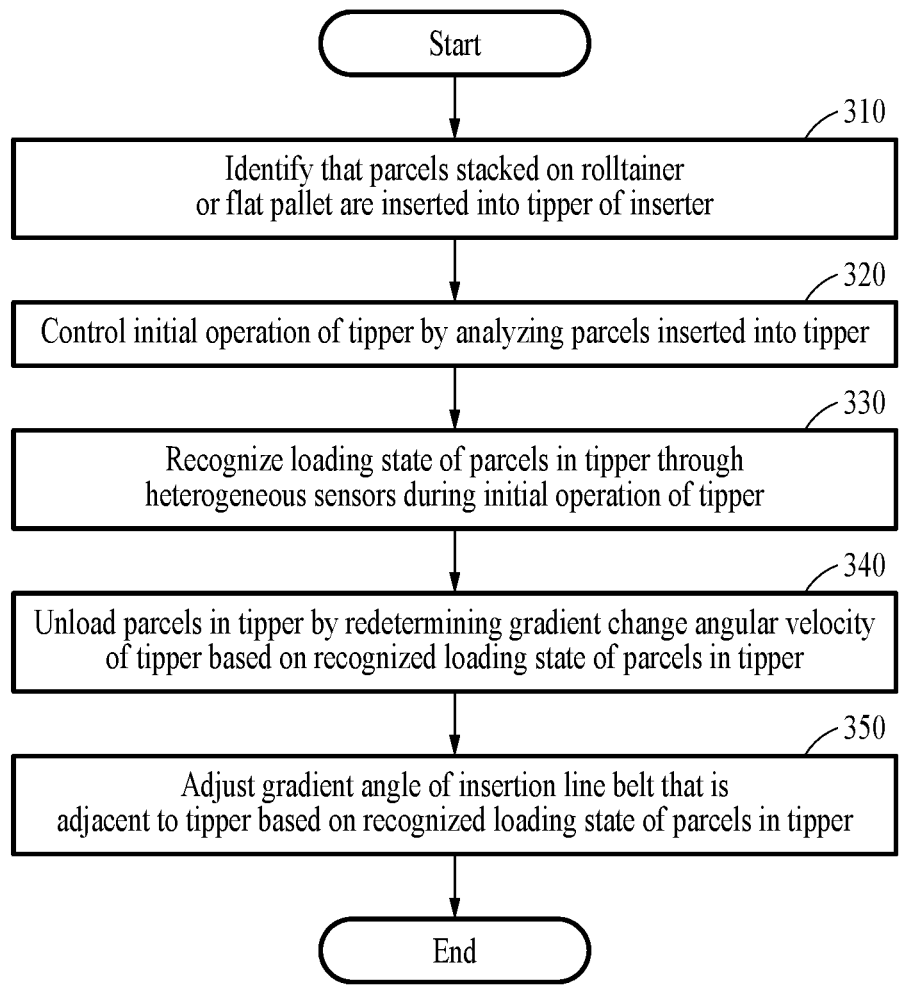
FIG. 3 is a flowchart illustrating an operating principle of an inserter according to an embodiment.

FIG. 3 is a flowchart illustrating an operating principle of an inserter according to an embodiment.

The operating principle of the inserter illustrated in FIG. 3 may be performed by the processor 210 of the insertion automation device 200.

In operation 310, the processor 210 may identify that parcels loaded on a rolltainer or a flat pallet are inserted into a tipper of the inserter 120.

In operation 320, the processor 210 may control an initial operation of the tipper by analyzing the parcels inserted into the tipper. More specifically, the processor 210 may determine an initial gradient change angular velocity of the tipper by measuring the total weight of the parcels loaded on the rolltainer or the flat pallet through the tipper. In this case, the processor 210 may determine the initial gradient change angular velocity of the tipper to be a lower value as the total weight of the loaded parcels increases and may determine the initial gradient change angular velocity of the tipper to be a higher value as the total weight of the loaded parcels decreases.

For example, the processor 210 may store a relationship between the total weight of the loaded parcels and the initial gradient change angular velocity of the tipper in a profile form in advance and use the stored relationship.

In operation 330, the processor 210 may recognize a loading state of the parcels in the tipper through heterogeneous sensors during the initial operation of the tipper. More specifically, the processor 210 may identify the position, type, or size of the parcels loaded on the rolltainer or the flat pallet in the tipper by inputting images of the parcels in the tipper which are obtained through a plurality of cameras included in the tipper.

In addition, the processor 210 may estimate the position and size of the parcels loaded on the rolltainer or the flat pallet in the tipper by measuring a relative distance between the parcels in the tipper through a lidar sensor, an ultrasonic sensor, or other sensors included in the tipper.

As such, the processor 210 may more accurately recognize the loading state of the parcels in the tipper by combining pieces of information obtained through the heterogeneous sensors included in the tipper.

In operation 340, the processor 210 may unload the parcels in the tipper by redetermining a gradient change angular velocity and gradient angle of the tipper based on the recognized loading state of the parcels in the tipper. For example, the processor 210 may determine the gradient change angular velocity of the tipper to be the highest speed when a packing material of the parcels in the tipper is recognized as vinyl. For another example, the processor 210 may determine the gradient change angular velocity of the tipper to be the lowest speed when the packing material of the parcels in the tipper is recognized as polystyrene. Alternatively, when the packing material of the parcels in the tipper is recognized as paper, the processor 210 may determine the gradient change angular velocity of the tipper (or tipper angular velocity (TAV)) according to Equation 1 below.

$$TAV = a*W - b*S - c*D \qquad \text{Equation 1}$$

Here, W denotes the total weight of parcels, S denotes the recognized size of a parcel, D denotes a relative distance of parcels in the tipper, and a, b, and c are adjustable coefficients.

In operation 350, the processor 210 may adjust a gradient angle of an insertion line belt that is adjacent to the tipper based on the recognized loading state of the parcels in the tipper. More specifically, the processor 210 may adjust the gradient angle of the insertion line belt that is adjacent to the tipper to minimize an impact on parcels when the recognized weight of the parcels in the tipper is heavy or the recognized packing material of the parcels is fragile.

For example, the processor 210 may determine the gradient angle of the insertion line belt that is adjacent to the tipper, that is, a slope damping belt height (SH), to be the highest when the recognized packing material of the parcels in the tipper is vinyl. For another example, when the recognized packing material of the parcels in the tipper is polystyrene or paper, the processor 210 may determine the SH according to Equation 2 below.

$$SH = d*W + e*S - f*D \qquad \text{Equation 2}$$

Here, d, e, and f are adjustable coefficients.

In addition, the processor 210 may determine the SH to be higher as the recognized total weight of the parcels in the tipper increases and may determine the SH to be lower as the total weight of the parcels in the tipper decreases.

On the other hand, a damping system may be applied to a lower part of the insertion line belt that is adjacent to the tipper and in which the gradient angle may be adjusted to minimize the damage to the parcels unloaded from the tipper, and the parcels may be supplied to the destacker 130.

Figure 4A:
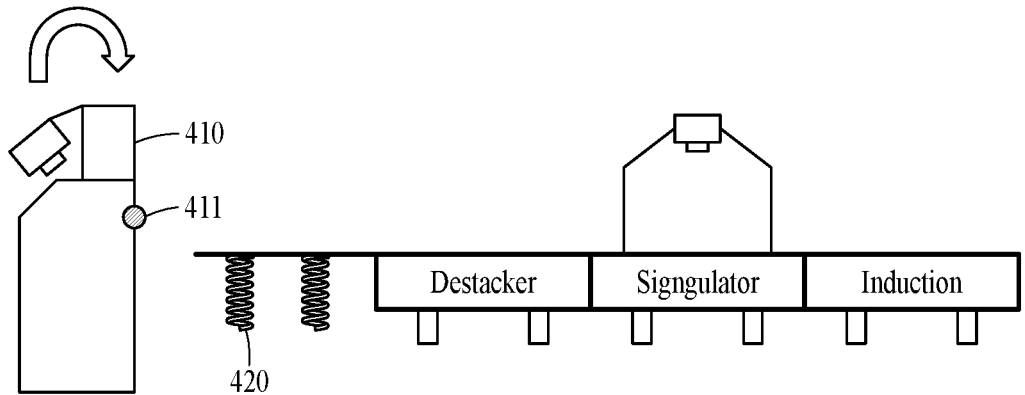
FIG. 4A to 4C are a diagram illustrating an operation example and a configuration of a parcel sorting system using a tipper and an insertion line belt, according to an embodiment.
Figure 4B:
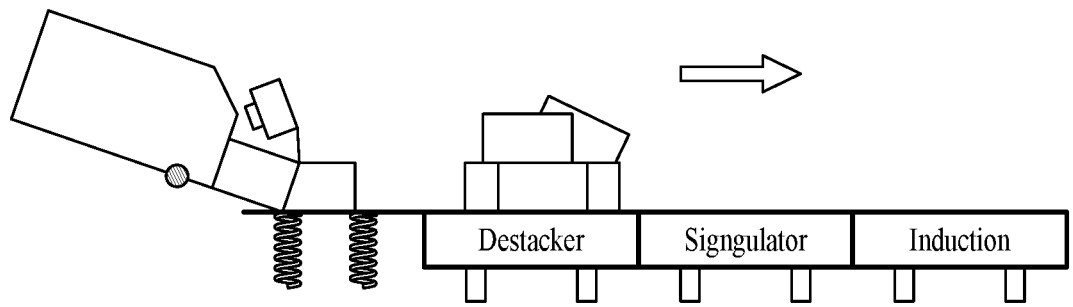
Figure 4C:
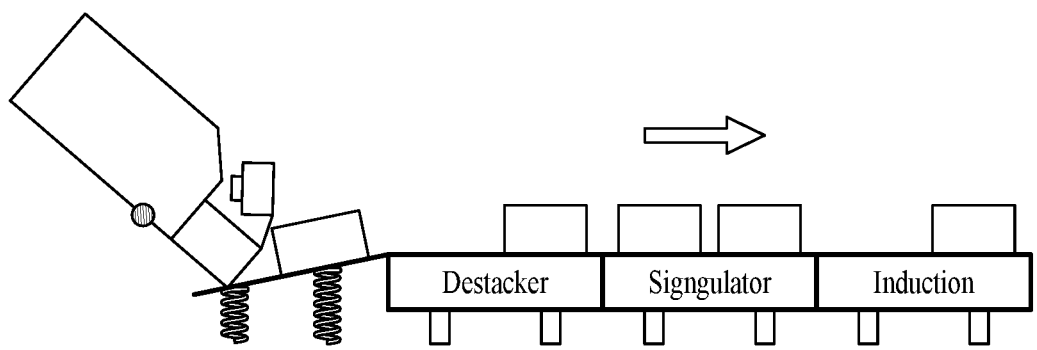

FIG. 4A to 4C are a diagram illustrating an operation example and a configuration of a parcel sorting system using a tipper and an insertion line belt, according to an embodiment.

Referring to FIG. 4A, a tipper 410 may have a structure that is rotatable 180 degrees around a rotation shaft 411. When a rolltainer or a flat pallet is loaded in the tipper 410 that is in a perpendicular state, the processor 210 of the insertion automation device 200 may determine an initial gradient change angular velocity of the tipper 410 by measuring the total weight of loads.

In addition, the rolltainer or the flat pallet loaded in the tipper 410 may include fragile or heavy parcels. When the parcels unloaded from the tipper 410 fall right into an insertion line by the tilting of the tipper 410 as illustrated in FIG. 4B, the impact therefrom may cause problems.

To prevent the problems, the parcel sorting system 100 of the present disclosure may minimize the impact on the parcels from falling through an insertion line belt 420 in which a gradient may be adjusted as illustrated in FIG. 4C. More specifically, the gradient angle of the insertion line belt 420 may be adjusted based on a loading state of the parcels in the tipper 410 that is recognized through a plurality of heterogeneous sensors. In addition, a damping system may be applied to a lower part of the insertion line belt 420, and the impact on the parcels from falling may further decrease.

Figure 5A:
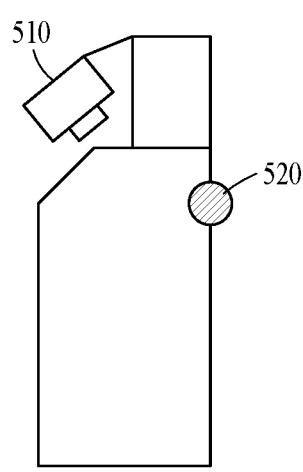
FIG. 5A to 5C are a diagram illustrating an example of a tipper in which a gradient is adjustable, according to an embodiment.
Figure 5B:
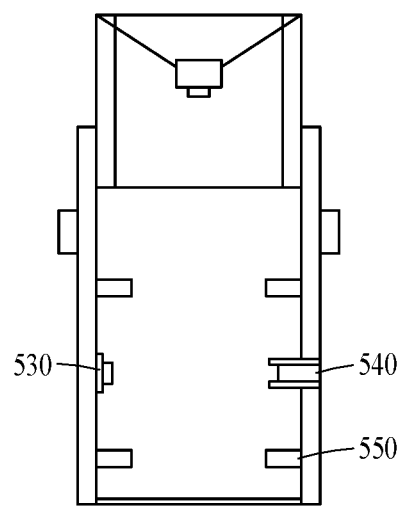
Figure 5C:
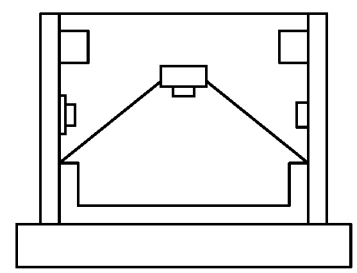

FIG. 5A to 5C are a diagram illustrating an example of a tipper in which a gradient is adjustable, according to an embodiment.

FIG. 5A is a diagram illustrating a side surface of the tipper, FIG. 5B is a diagram illustrating a front surface of the tipper, and FIG. 5C is a diagram illustrating a top surface of the tipper. Referring to FIG. 5A, the processor 210 of the insertion automation device 200 may recognize the type of a rolltainer or a flat pallet, a packing material, and the like by using images obtained through a camera sensor 510 on top of an outputter of the tipper when parcels loaded on the rolltainer or the flat pallet are loaded in the tipper.

In addition, the processor 210 may determine an initial gradient angle of the tipper by measuring a volume of a parcel loaded in the tipper by using the images obtained through the camera sensor 510. In this case, a rotation shaft 520 of the tipper may function as a fixed support for rotating the tipper 180 degrees. The processor 210 may rotate the tipper according to a gradient control command of the tipper that is generated through a parcel recognition result based on the rotation shaft 520.

The processor 210 may obtain a parcel load, a packing material, and other additional pieces of information that may not be identified by the camera sensor 510 on top of the tipper through additional sensors such as a lidar sensor 540 and a camera sensor 530 inside the tipper. These sensors may improve the accuracy of recognizing an individual parcel by approaching the loaded parcels closer than the camera 510 on top of the tipper and by sensing the loaded parcels. In addition, the tipper may further include a fixing device 550 for fixing the rolltainer or the flat pallet when the rolltainer or the flat pallet is loaded.

Figure 6:
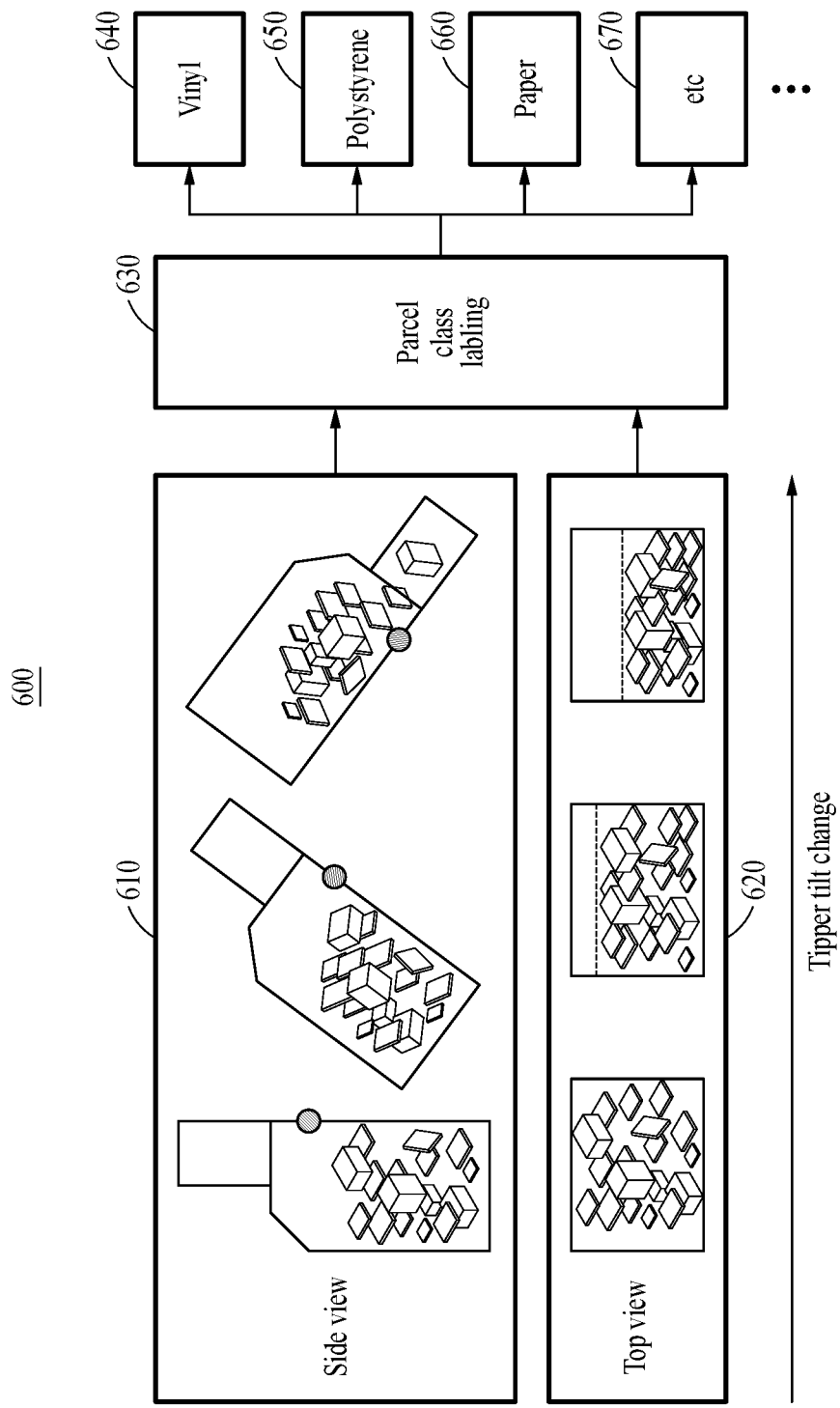
FIG. 6 is a diagram illustrating an example of generating training data of an object recognition model for parcel recognition by each gradient of a tipper, according to an embodiment.

FIG. 6 is a diagram illustrating an example of generating training data of an object recognition model for parcel recognition by each gradient of a tipper, according to an embodiment.

Referring to FIG. 6, the processor 210 of the insertion automation device 200 may generate training data 600 of an object recognition model for parcel recognition by changing the gradient of the tipper. The processor 210 may obtain images corresponding to a side surface view 610 and a top surface view 620 according to a change in the gradient of the tipper through a camera. In this case, the obtained images may include information on a packing material of parcels, a position of the parcels, and the like.

The processor 210 may label the packing material of the parcels for each of the obtained images in operation 630. For example, the processor 210 may generate the training data 600 of the object recognition model for parcel recognition by labeling the parcels for each of the obtained images in operation 630 after classifying the parcels into vinyl 640, polystyrene 650, such as Styrofoam, paper 660, and other classifiable class 670.

In this process, the processor 210 may estimate the size of a parcel in the object recognition model by mapping the number of pixels in an image to an actual parcel size. For example, the processor 210 may obtain a correlation between the actual size of a parcel and pixels of an image when the actual horizontal or vertical length of the parcel is A, and the number of pixels corresponding thereto of the parcel in images 610 and 620 of the training data 600 is X in the images 610 and 620 of the training data 600.

In addition, when the horizontal or vertical length of a parcel of an input image to be recognized is B, and the number of pixels of the parcel in the input image to be recognized is Y, by using the correlation, the processor 210 may approximately estimate the horizontal or vertical length of the parcel that is loaded in the tipper through Equation 3 below.

$$B = \frac{Y}{X} ? A \qquad \text{Equation 3}$$

Figure 7:
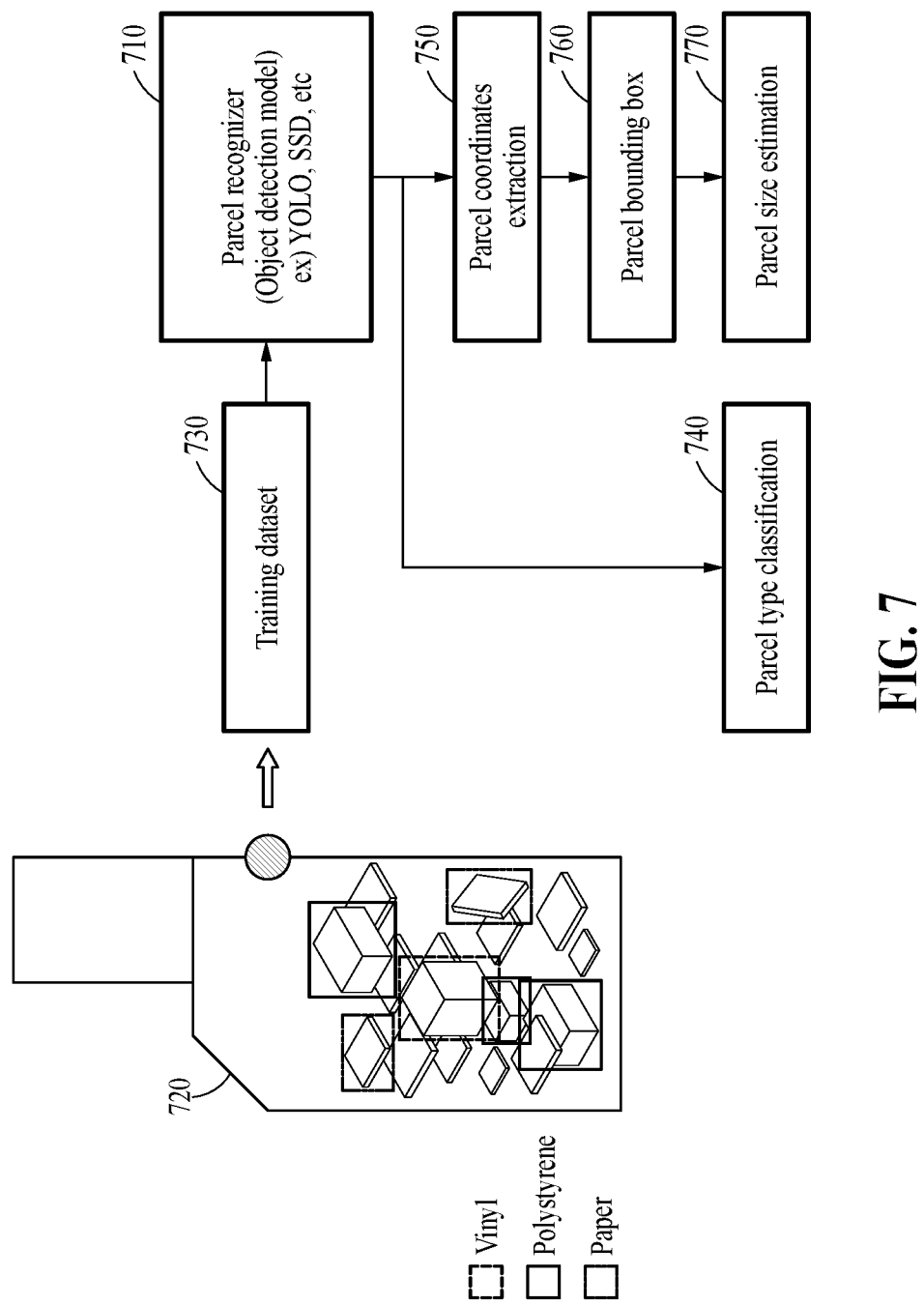
FIG. 7 is a diagram illustrating a training method of an object recognition model using training data, according to an embodiment.

FIG. 7 is a diagram illustrating a training method of an object recognition model using training data, according to an embodiment.

Referring to FIG. 7, an object recognition model 710 may recognize a parcel by performing object recognition by using the training data generated in the process described above with reference to FIG. 6. In this case, although the object recognition model 710 is you only lockdown once (YOLO) or a single shot detector (SSD), such type of the object recognition model is just an example, and examples are not limited thereto.

More specifically, the object recognition model 710 may receive the training data including results from labeling an image obtained according to the gradient of a tipper as illustrated in a view 720. In this case, the received training data may correspond to a training dataset 730.

When the training dataset 730 is input, the object recognition model 710 may identify object shapes in images included in the training dataset 730 through object recognition. The object recognition model 710 may classify a packing material corresponding to the identified object shapes in the images in operation 740 by using a labeling value included in the training dataset 730.

At the same time, the object recognition model 710 may extract the object shapes in the images included in the training dataset 730, that is, coordinate information of parcels, in operation 750, may bound an individual recognition area of each of the parcels based on the extracted coordinate information in operation 760, and may estimate the size of a parcel corresponding to the individual recognition area based on the number of pixels related to the bound individual recognition area in operation 770.

Figure 8:
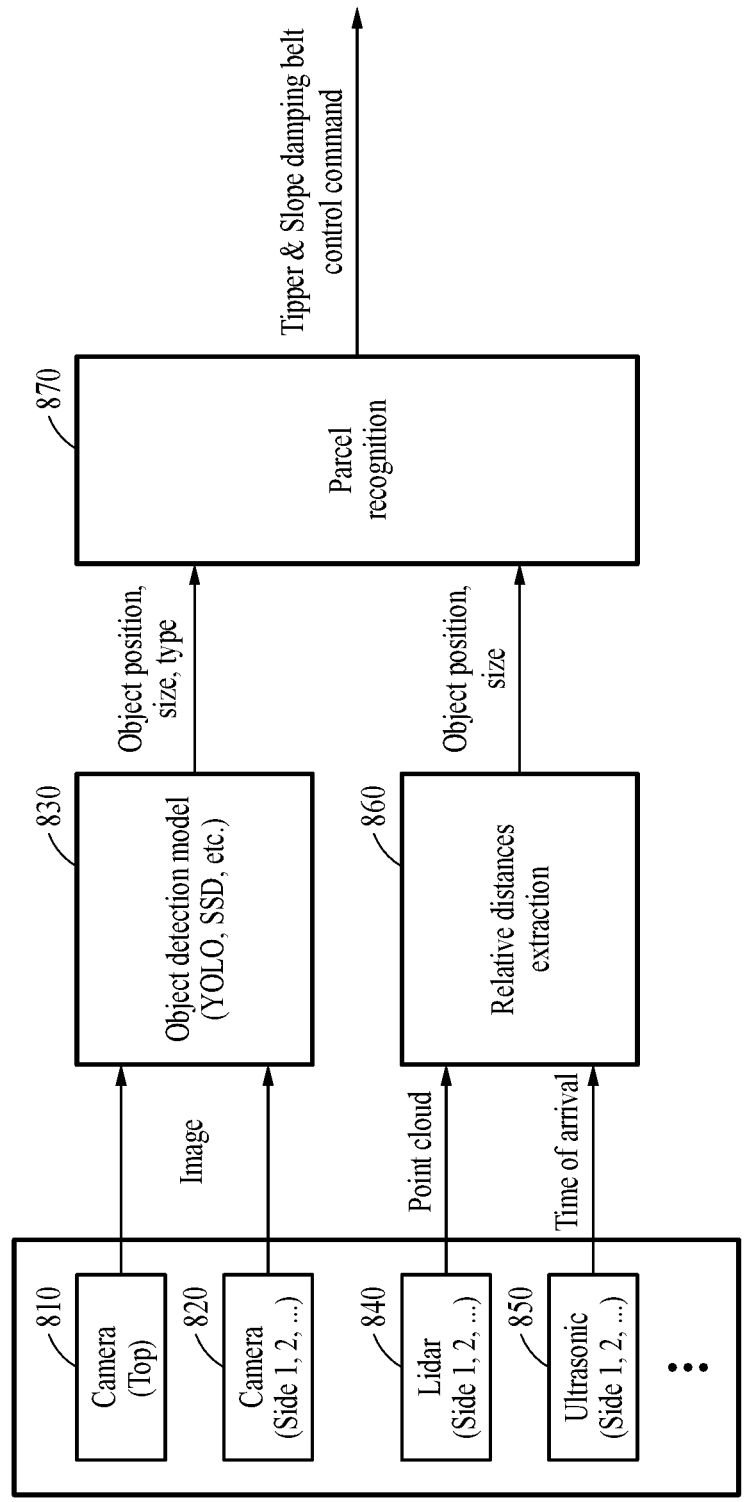
FIG. 8 is a diagram illustrating an example of generating a control command of an insertion automation system based on deep learning parcel recognition, according to an embodiment.

FIG. 8 is a diagram illustrating an example of generating a control command of an insertion automation system based on deep learning parcel recognition, according to an embodiment.

First, the insertion automation system may include a camera sensor 810 for obtaining images corresponding to a top surface view of a tipper and a camera sensor 820 for obtaining images corresponding to a side surface view of the tipper. The insertion automation system may input the images obtained through the camera sensors 810 and 820 to an object recognition model 830 for parcel recognition. In this case, the object recognition model 830 may be the object recognition model 710 that is trained through the training data, that is, the training dataset, as described above with reference to FIG. 7. The object recognition model 830 may classify the position, size, and packing material of a parcel by analyzing the images obtained through the camera sensors 810 and 820.

In addition, the insertion automation system may further use a lidar sensor 840 or an ultrasonic sensor 850, besides the camera sensors 810 and 820. The insertion automation system may extract a relative distance of parcels in the tipper through the images obtained through the lidar sensor 840 or the ultrasonic sensor 850 in operation 860 and may identify the information on the position and size of the parcels through the extracted relative distance.

The insertion automation system may recognize an accurate loading state of the parcels loaded in the tipper in operation 870 by combining the information on the position and size of the parcels identified through the lidar sensor 840 or the ultrasonic sensor 850 with a classification result of the position, size, and packing material of the parcels performed through the object recognition model 830.

The insertion automation system may generate a gradient angle control value of the tipper and a gradient angle control value of an insertion line belt that needs to be adjusted to supply the parcels to an inserter when recognizing the loading state of the parcels loaded in the tipper. The insertion automation system may control an operation of the tipper and the insertion line belt according to the gradient angle control value of the tipper and the insertion line belt to minimize an impact on the parcels, and a system in which insertion is automatically performed may be implemented by minimizing the intervention of a person.

The examples described herein may be implemented by using a hardware component, a software component and/or a combination thereof. A processing device may be implemented using one or more general-purpose or special-purpose computers, such as, for example, a processor, a controller and an arithmetic logic unit (ALU), a DSP, a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or collectively instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, other implementations, other examples, and equivalents to the claims are also within the scope of the following claims.

What is claimed is:

1. An insertion automation method comprising:
   determining an initial gradient change angular velocity of a tipper based on a total weight of parcels in the tipper;
   recognizing a loading state of the parcels in the tipper by inputting images of the parcels in the tipper to an object recognition model; and
   redetermining a gradient change angular velocity of the tipper based on the recognized loading state, wherein the loading state of the parcels in the tipper comprises at least one of a position, size, and packing material of the parcels in the tipper.

2. The insertion automation method of claim 1, wherein the object recognition model comprises:
   a neural network trained to infer a packing material of each of parcels comprised in a training image in response to the training image that is predetermined being input.

3. The insertion automation method of claim 1, wherein the object recognition model comprises:
   a neural network trained to infer a size of parcels based on coordinate information of the parcels comprised in a training image in response to the training image that is predetermined being input.

4. The insertion automation method of claim 1, further comprising extracting a relative distance of the parcels in the tipper through heterogeneous sensors.

5. The insertion automation method of claim 4, wherein the recognizing comprises updating the loading state of the parcels in the tipper by combining the extracted relative distance of the parcels in the tipper with a recognition result of the object recognition model.

6. The insertion automation method of claim 1, further comprising adjusting a gradient angle of an insertion line belt that is adjacent to the tipper based on the recognized loading state of the parcels in the tipper.

7. The insertion automation method of claim 6, wherein a damping system is applied to a lower part of the insertion line belt in which the gradient angle is adjusted.

8. An insertion automation device comprising:
   one or more processors; and
   a memory configured to load or store a program executed by the one or more processors, wherein the program comprises:
   instructions configured to determine an initial gradient change angular velocity of a tipper based on a total weight of parcels in the tipper, recognize a loading state of the parcels in the tipper by inputting images of the parcels in the tipper to an object recognition model, and redetermine a gradient change angular velocity of the tipper based on the recognized loading state, wherein
   the loading state of the parcels in the tipper comprises at least one of a position, size, and packing material of the parcels in the tipper.

9. The insertion automation device of claim 8, wherein the object recognition model comprises a neural network trained to infer a packing material of each of parcels comprised in a training image in response to the training image that is predetermined being input.

10. The insertion automation device of claim 8, wherein the object recognition model comprises a neural network trained to infer a size of parcels based on coordinate information of the parcels comprised in a training image in response to the training image that is predetermined being input.

11. The insertion automation device of claim 8, wherein the one or more processors are configured to extract a relative distance of the parcels in the tipper through heterogeneous sensors.

12. The insertion automation device of claim 11, wherein the one or more processors are further configured to
   update and recognize the loading state of the parcels in the tipper by combining the extracted relative distance of the parcels in the tipper with a recognition result of the object recognition model.

13. The insertion automation device of claim 8, wherein the one or more processors are further configured to
   adjust a gradient angle of an insertion line belt that is adjacent to the tipper based on the recognized loading state of the parcels in the tipper.

14. The insertion automation device of claim 13, wherein a damping system is applied to a lower part of the insertion line belt in which the gradient angle is adjusted.

* * * * *